United States Patent [19]

Susi

[11] Patent Number: 4,740,542

[45] Date of Patent: * Apr. 26, 1988

[54] STABILIZATION OF HIGH SOLIDS COATINGS WITH SYNERGISTIC COMBINATIONS

[75] Inventor: Peter V. Susi, Middlesex, N.J.

[73] Assignee: American Cyanamid Company, Stamford, Conn.

[*] Notice: The portion of the term of this patent subsequent to Oct. 28, 2003 has been disclaimed.

[21] Appl. No.: 895,544

[22] Filed: Aug. 11, 1986

Related U.S. Application Data

[63] Continuation of Ser. No. 730,146, May 3, 1985, Pat. No. 4,619,956.

[51] Int. Cl.$^4$ .............................................. C08K 5/34
[52] U.S. Cl. ........................................ 524/87; 524/89; 524/91; 524/92; 524/94; 524/99; 524/100; 524/102
[58] Field of Search ...................... 524/87, 89, 91, 92, 524/94, 99, 100, 102

[56] References Cited

U.S. PATENT DOCUMENTS

| | | | |
|---|---|---|---|
| 3,118,887 | 1/1964 | Hardy et al. | 544/216 |
| 3,268,474 | 8/1966 | Hardy et al. | 264/252 |
| 4,314,933 | 2/1982 | Berner | 523/456 |
| 4,355,071 | 10/1982 | Chang | 428/334 |
| 4,356,307 | 10/1982 | Kelkenberg et al. | 546/200 |
| 4,419,472 | 12/1983 | Berner et al. | 524/102 |
| 4,426,471 | 1/1984 | Berner | 524/91 |
| 4,426,472 | 1/1984 | Berner | 524/99 |
| 4,524,165 | 6/1985 | Musser et al. | 524/99 |
| 4,525,504 | 6/1985 | Morris et al. | 524/99 |
| 4,530,950 | 7/1985 | Raspanti et al. | 524/100 |
| 4,619,956 | 10/1986 | Susi | 524/87 |

FOREIGN PATENT DOCUMENTS 0078603  5/1983  European Pat. Off. .
0087294  8/1983  European Pat. Off. .

OTHER PUBLICATIONS

"Organic Coatings", Sci & Tech., vol. 6, Ed Parfitt et al, 1984, pp. 55–85.

Primary Examiner—Herbert J. Lilling
Attorney, Agent, or Firm—Roger S. Benjamin

[57] ABSTRACT

A method of stabilizing a polymer film coating or molded article against the action of light, moisture, and oxygen is disclosed. The method comprises incorporating in said polymer a stabilizingly and synergistically effective amount of:

(A) A 2,2,6,6-tetraalkylpiperidine compound, or the acid addition salts or complexes with metal compounds thereof; and (B) A tris-aryl-s-triazine compound represented by the formula:

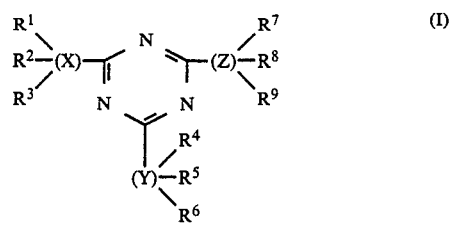

wherein X, Y and Z are each aromatic, carbocylic radicals of less than three 6-membered rings, and at least one of X, Y and Z is substituted by a hydroxy group ortho to the point of attachment to the triazine ring; and each of $R^1$ through $R^9$ is selected from the group consisting of hydrogen, hydroxy, alkyl, alkoxy, sulfonic, carboxy, halo, haloalkyl and acylamino.

15 Claims, No Drawings

STABILIZATION OF HIGH SOLIDS COATINGS WITH SYNERGISTIC COMBINATIONS

This is a continuation, of application, Ser. No. 730,146, filed May 3, 1985, now U.S. Pat. No. 4,619,956.

FIELD

This invention relates to synergistic combinations of hindered amine light stabilizers (HALS) and ultraviolet absorbers (UVA).

BACKGROUND

The use of HALS and UVA individually or in combination to stabilize synthetic resins, plastics, and the lacquers and coatings made therefrom against light degradation is well known. Formerly, UVA such as benzotriazoles, benzophenones, tris-aryl-triazines, and the like were used to stabilize materials susceptible to degradation by light, particularly ultraviolet (UV) light. When the class of compounds known as HALS was discovered, the use of UVA became secondary in use to the HALS. Thus, for example, patents relating to HALS and their use usually disclosed that UVA may be used in addition to the HALS if desired.

U.S. Pat. Nos. 3,118,887 and 3,268,474 disclose the stabilization of plastic and resinous compositions against the effects of ultraviolet light by the incorporation therein of one or more members of a class of tris-aryl-triazines. The aryl radicals of the tris-aryl-triazines UVA are carbocyclic groups of less than three 6-membered rings and at least one of the aryl radicals is substituted by a hydroxyl group which is ortho to the point of attachment to the triazine nucleus. The remaining substituents are either hydroxy, alkyl, alkoxy, sulfonic, carboxy, halo, haloalkyl or acylamino (wherein the acyl is derived from a carboxylic acid). See for example, Formula I in Column 1 and Formula II in Column 2 of U.S. Pat. No. 3,118,887, and Formulas I and II in Column 2 of U.S. Pat. No. 3,268,474.

U.S. Pat. No. 4,355,071 discloses a substrate having a finish of a clear coat top layer in firm adherence to a color coat layer that is in adherence with the substrate. The clear coat consists essentially of a transparent film forming binder. The color coat consists essentially of a film-forming binder, pigment and ultraviolet light stabilizer. The ultraviolet light stabilizer migrates from the color coat to the clear coat. This migration continues as ultraviolet light stabilizer is lost from the clear coat due to exposure to weathering. This provides an adequate level of ultraviolet light stabilizer to retard deterioration of the finish. The resulting finish is particularly useful for automobile and truck finishes. The ultraviolet light stabilizers that are useful include benzophenones, triazoles, triazines, and benzoates among others—see the examples given in Columns 3 and 4.

U.S. Pat. No. 4,314,933, discloses a method for stabilizing two-layer uni-lacquer coatings based on acrylic, alkyd or polyester resins, melamine/formaldehyde resins, epoxide resins or polyisocyanates against the adverse effects of light, humidity and oxygen. The method comprises incorporating into said resin (1) a 2,2,6,6-tetraalkylpiperidine compound, its acid addition salts or metal complexes, and (2) a ultraviolet light absorbing compound. The 2,2,6,6-tetraalkylpiperidine compounds are generally known. See for example Column 1 (Formulas I and II) ; Column 3 (Formula III); Column 5 (Formula IV); Column 6 (Formulas VA-C); Column 7 (Formula VI); Column 11 (Formula VII); Column 12 (formula VIII); Column 14 (polymeric compounds in which the recurring structural unit contains a polyalkylpiperidine radical of Formula I); and Column 15 (compounds which contain, in their molecule, at least one 2-(2'-hydroxyphenyl)-benztriazole group or 2-hydroxybenzophenone group and at least one polyalkylpiperidine group). The patent discloses that in order to achieve maximum stability to light, it can be advantageous to use other conventional light stabilizers. Examples of these are UV-absorbers of the type comprising the benzophenones, oxanilides, benztriazoles or acrylic acid derivatives, or metal-containing light stabilizers, for example, organic nickel compounds.

U.S. Pat. No. 4,356,307 discloses stabilizers for synthetic resins, especially for polyolefins. The stabilizers have a cyclic imide bound to the 4-position of a 2,2,6,6,-tetramethylpiperidine—see for example the Formula in Column 1.

U.S. Pat. No. 4,419,472 discloses ester mixtures of polyalkylpiperidine derivatives in which the ester substituent is in the 4-position of the polyalkylpiperidine —see Formulas I and II in Column 1. These mixtures are suitable as stabilizers for plastics. Other stabilizers which are known can also be incorporated in the plastics with the ester mixtures. These include UV-absorbers and light stabilizers, such as, 2-(2'-hydroxyphenyl)-benztriazoles, 2-hydroxybenzophenones, and sterically hindered amines, among others—see Columns 6–7. The patent discloses that known and conventional additives of this type are not only compatable with the mixtures of esters but, in individual cases, can also result in a synergistic effect.

U.S. Pat. No. 4,426,471 discloses a stabilized lacquer composition comprising: (a) an acid catalyzed stoving lacquer based on hot crosslinkable acrylic, polyester or alkyd resins; (b) an N-substituted 2,2,6,6-tetraalkylpiperidine compound or its acid addition salt; (c) a UV absorber selected from the group consisting of the benzophenones, benzotriazoles, acrylic and derivatives, organic nickel compounds and oxanilides; and (d) a phenolic antioxidant. The N-substituted 2,2,6,6-tetraalkylpiperidine compounds are generally known. See for example Column 1 (Formula I); Column 2 (Formula II); Column 3 (Formula VIII); Column 5 (Formula IV); Column 6 (Formula V); Column 7 (Formula VI); Column 9 (Formula VII); Column II (Formula VIII); Column 12 (polymeric compounds, the recurring structural units of which contain a group of the Formula I or which are linked through a bivalent group corresponding to Formula I); and Column 15 (compounds which contain in their molecule at least one 2-(2'-hydroxyphenyl)-benztriazole group or 2-hydroxybenzophenone group and at least one polyalkylpiperidine group). Examples of UV absorbers which may be used in conjunction with the aforementioned piperidine compounds are provided in Columns 17–18.

U.S. Pat. No. 4,426,472 discloses a method for stabilizing metallic stoving lacquers based on hot-cross-linkable alkyd resins or acrylic resins against the action of light, moisture and oxygen. The method comprises incorporating in the resin an effective stabilizing amount of a 2,2,6,6-tetraalkylpiperidine compound, or of the acid addition salts or complexes with metal compounds thereof. The patent discloses that to obtain maximum stability to light, the concomitant use of other customary stabilizers can be advantageous. Examples of these are UV absorbers of the benzophenone, oxanilide or benzotriazole type, or acrylic acid derivatives, or metal-containing light stabilizers, such as organic nickel compounds. The 2,2,6,6-tetraalkylpiperidine compounds are generally known. See for example Column 1 (Formulas I and II); Column 3 (Formula III); Column 5 (Formulas IV and V); Column 7 (Formula VI); Column 11 (Formula VII); Column 13 (Formula VIII); and Column 14 (polymeric compounds of which the recurring structural unit contains a polyalkylpiperidine radical of Formula I).

European Patent Application No. 82304941.6, Publication Number 0078603, Published May 5, 1983, Bulletin 83/19,. discloses a composition comprising a substantially crystalline polymer of an aliphatic monoalpha-olefin and a hindered amine or its salt, N-oxide, N-hydroxide, or N-nitroxide. The hindered amine has its amino nitrogen contained in a carbon-nitrogen carbon chain which forms part of a non-aromatic heterocyclic ring. Also, each of the two carbon atoms of the chain is bonded to two lower alkyl groups, which may be the same or different, each lower alkyl group containing from 1 to 12 carbon atoms, or to an alicyclic group containing from 4 to 9 carbon atoms which groups sterically hinder the amine. The composition may also contain, for example, stabilizing amounts of light stabilizers, e.g., benztriazoles.

European Patent Application No. 83300861.8, Publication Number 0087294, Published Aug. 31, 1983, Bulletin 83-85, discloses an irradiation sterilizable composition comprising a semi-crystalline polymer. Incorporated in the polymer is a mobilizing amount of a non-crystalline liquid mobilizing additive which increases the free volume of the polymer. Also, incorporated in the polymer is a sterically hindered amine or its N-oxide, N-hydroxide or N-nitroxide salt. The amine nitrogen of the hindered amine is contained in a carbon-nitrogen-carbon chain which forms part of a non-aromatic heterocyclic ring. Each of the two carbon atoms of the chiain is bonded either to two alkyl groups which are the same or different and each having 1 to 12 carbon atoms, or to an alicyclic group containing 4 to 9 carbon atoms. The composition may contain stabilizing amounts of, for example, light stabilizers, e.g., benzotriazoles.

Berner, G., and Rembold, M. "New Light Stabilizers For High-Solid Coatings", in *Organic Coatings, Science and Technology, Volume 6*, (1984), Edited by Parfitt, G. D. et al, pp.p. 55–85, TP 1175. S607, discloses the synergistic combination of a sterically hindered amine light stabilizer (radical scavenger) with a benztriazole UV-absorber. It is also disclosed that a new HALS-type combined with a benztriazole (designated Benztriazole I—see page 58) in a 1-package high-rated paint proved to be an outstanding stabilizer package. The high-solid paint was based upon a hydroxyl-functional acrylic resin and a HMMM resin (a fully alkylated melamine resin) as the crosslinker. Further disclosed, at pages 83–84, is that light stabilizers are complementary to each other. This synergism can possibly be explained based upon the assumption that fewer radical processes are photochemically induced in the presence of UVA. It has been shown by model experiments that the (relative) stabilizing effect of HALS may depend on the number of radical processes induced with time. Therefore, at high rates of radical initiation (in the absence of UV absorber) the observed efficiency of HALS is lower since the higher radical concentrations are not as effectively controlled by the stabilizers.

Although the use of HALS and UVA in combination with each other is well known, there has been relatively little known work on or discovery of combinations of particular HALS and UVA that will produce synergistic results. An exception to this, as noted above, is the use of a benztriazole with a HALS of unknown structure in a high-solid paint (Berner et al above). A welcome contribution to the art would be synergistic combinations of HALS and UVA to provide polymers with protection against degradation by light. Such a contribution is provided by this invention.

SUMMARY OF THE INVENTION

This invention provides a method of stabilizing a polymer against the action of light, moisture, and oxygen comprising incorporating in said polymer a stabilizingly and synergistically effective amount of:

(A) A 2,2,6,6-tetraalkylpiperidine compound, or the acid addition salts or complexes with metal compounds thereof; and (B) A tris-aryl-s-triazine compound represented by Formula (I):

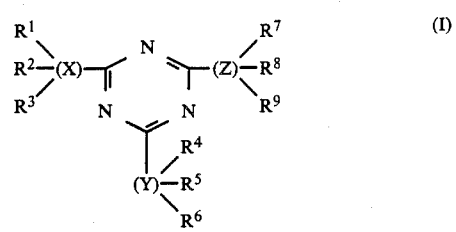

wherein X, Y and Z are each aromatic, carbocylic radicals of less than three 6-membered rings and at least one of X, Y and Z is substituted by a hydroxy group ortho to the point of attachment to the triazine ring; and each of $R^1$ through $R^9$ is selected from the group consisting of hydrogen, hydroxy, alkyl, alkoxy, sulfonic, carboxy, halo, haloalkyl and acylamino.

DETAILED DESCRIPTION OF THE INVENTION

The polymers which can be stabilized according to the methods of this invention include those which form films and coatings, and those from which molded articles are produced. Preferably acid catalyzed thermoset acrylic or alkyd coatings are stabilized, most preferably high solids thermoset acrylic coatings are stabilized by the methods of this invention.

The film-forming binder used in the coatings can be those well known in the art. For instance, solvent- or water-based arcylic lacquers, acrylic dispersion lacquers, solvent- or water-based thermosetting acrylic enamels, polyester enamels, non-aqueous acrylic dispersion enamels, alkyl resin enamels, polyurethane enamels and acrylic or polyester powder coatings can be used. These coatings are described in detail in U.S. Pat. No. 4,355,071, the disclosure of which is incorporated herein by reference.

The HALS are well known in the art and can include their salts, N-oxides and N-hydroxides. In general, the HALS can be described as having an amino nitrogen contained in a carbon-nitrogen-carbon chain which forms part of a non-aromatic heterocyclic ring where each of the two carbon atoms of the chain is bonded to two lower alkyl groups which may be the same or different, each lower alkyl group containing from 1 to 12 carbon atoms, or to an alicyclic group containing from 4 to 9 carbon atoms, which groups sterically hinder the amine.

In particular, the HALS useful in the method of this invention are 2,2,6,6-tetraalkylpiperidines, their acid addition salts or complexes with metal compounds. These HALS are well known in the art and include compounds which contain a group represented by Formula II:

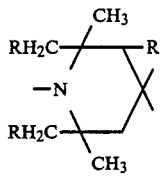

wherein R is hydrogen or methyl.

HALS utilizable in this invention also include, but are not limited to, compounds represented by the following:

1. Formula III

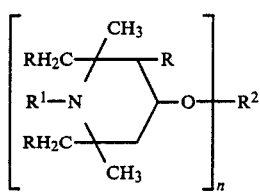

wherein:

n is a number from 1–4 inclusive, preferably 1 or 2;

R is as defined in Formula II;

$R^1$ is hydrogen, oxyl, $C_1$–$C_{18}$ alkyl, $C_3$–$C_8$ alkenyl or alkynyl, $C_7$–$C_{12}$ aralkyl, $C_1$–$C_8$ alkanoyl, $C_3$–$C_5$ alkenoyl, glycidyl, a group —$CH_2CH(OH)$—Z wherein Z is hydrogen, methyl or phenyl, with $R^1$ preferably being hydrogen, $C_1$–$C_{12}$ alkyl, allyl, benzyl, acetyl or acryloyl;

$R^2$, when n is 1, is hydrogen, $C_1$–$C_{18}$ alkyl optionally interrupted by one or more oxygen atoms, cyanoethyl, benzyl, glycidyl, a monovalent radical of an aliphatic, cycloaliphatic, araliphatic or aromatic carboxylic acid, or of carbamic acid, or of a phosphorous-containing acid, or a monovalent silyl radical, preferably a radical of an aliphatic carboxylic acid having 2–18 C atoms, of a cycloaliphatic carboxylic acid having 5–12 C atoms or of an aromatic carboxylic acid having 7–15 C atoms;

$R^2$, when n is 2, is $C_1$–$C_{12}$ alkylene, $C_4$–$C_{12}$ alkenylene, xylylene, a bivalent radical of an aliphatic, cycloaliphatic, araliphatic or aromatic dicarboxylic acid, of a dicarbamic acid or of a phosphorus-containing acid, or a bivalent silyl radical, preferably a radical of an aliphatic dicarboxylic acid having 2–36 C atoms, of a cycloaliphatic or aromatic dicarboxylic acid having 8–14 C atoms, or of an aliphatic, cycloaliphatic or aromatic dicarbamic acid having 8–14 C atoms;

$R^2$, when n is 3, is a trivalent radical of an aliphatic, cycloaliphatic or aromatic tricarboxylic acid, of an aromatic tricarbamic acid or of a phosphorus-containing acid, or a trivalent silyl radical; and $R^2$, when n is 4, is a tetravalent radical of an aliphatic, cycloaliphatic or aromatic tetracarboxylic acid;

2. Formula IV

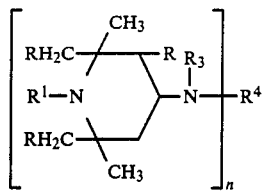

wherein:

n is the number 1 or 2;

R is as defined in Formula II;

$R^1$ is as defined in Formula III;

$R^3$ is hydrogen, $C_1$–$C_{12}$ alkyl, $C_5$–$C_7$ cycloalkyl, $C_7$–$C_8$ aralkyl, $C_2$–$C_{18}$ alkanoyl, $C_3$–$C_5$ alkenoyl or benzoyl;

$R^4$, when n is 1, is hydrogen, $C_1$–$C_{18}$ alkyl, $C_5$–$C_7$ cycloalkyl, $C_2$–$C_8$ alkenyl unsubstituted or substituted by a cyano, carbonyl or carbamide group, or it is glycidyl, a group of the formula—$CH_2$—$CH(OH)$—Z or of the formula—CONH-Z wherein Z is hydrogen, methyl or phenyl;

$R^4$ when n is 2, is $C_2$–$C_{12}$ alkylene, $C_6$–$C_{12}$ arylene, xylylene, a —$CH_2$—$CH(OH)$—$CH_2$ group, or a group —$CH_2$—$CH(OH)$—$CH_2$—O—X—O—$CH_2$—$CH(OH)$—$CH_2$— wherein X is $C_2$–$C_{10}$ alkylene, $C_6$–$C_{15}$ arylene or $C_6$–$C_{12}$ cycloalkylene;

or, provided that $R^3$ is not alkanoyl, alkenoyl or benzoyl, $R^4$ can also be a bivalent radical of an aliphatic, cycloaliphatic or aromatic dicarboxylic acid or dicarbamic acid, or can be the group —CO— or $R^3$ and $R^4$ together, when n is 1, can be the cyclic radical of an aliphatic or aromatic 1,2- or 1,3-dicarboxylic acid;

3. Formula V

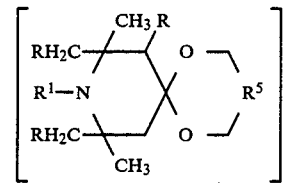

wherein;

n is the number 1 or 2;

R is as defined in Formula II;

$R^1$ is as defined in Formula III;

$R^5$, when n is 1, is $C_2$–$C_8$ alkylene or hydroxyalkylene or $C_4$–$C_{22}$ acyloxyalkylene; and $R^5$, when n is 2, is the group (—$CH_2$)$_2$C($CH_2$—)$_2$;

4. Formula VI

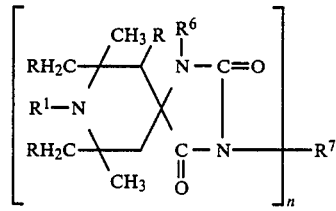

wherein:

n is the number 1 or 2;

R is as defined in Formula II;

$R^1$ is as defined in Formula III;

$R^6$ is hydrogen, $C_1$-$C_{12}$ alkyl, allyl, benzyl, glycidyl or $C_2$-$C_6$ alkoxyalkyl;

$R^7$, when n is 1, is hydrogen, $C_1$-$C_{12}$ alkyl, $C_3$-$C_5$ alkenyl, $C_7$-$C_9$ aralkyl, $C_5$-$C_7$ cycloalkyl, $C_2$-$C_4$ hydroxyalkyl, $C_2$-$C_6$ alkoxyalkyl, $C_6$-$C_{10}$ aryl, glycidyl, a group of the formula —(CH)—COO—Q or of the formula —(CH$_2$)$_m$—O—CO—Q wherein m is 1 or 2, and Q is $C_1$-$C_4$ alkyl or phenyl; or $R^7$ when n is 2 is $C_2$-$C_{12}$ alkylene, $C_6$-$C_{12}$ arylene, a group —CH$_2$—CH—(OH)—CH$_2$—O—X—O—CH$_2$—CH(OH)—CH$_2$— wherein X is $C_2$-$C_{10}$ alkylene, $C_6$-$C_{15}$ arylene or $C_6$-$C_{12}$ cycloalkylene, or a group —CH$_2$CH(OZ')CH$_2$—(OCH$_2$—CH(OZ')—CH$_2$)$_2$— wherein Z' is hydrogen, $C_1$-$C_{18}$ alkyl, allyl, benzyl, $C_2$-$C_{12}$ alkanoyl or benzoyl;

5. Formula VII

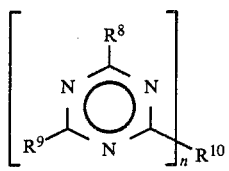

(VII)

wherein:

n is the number 1 or 2;

$R^8$ is a group of the formula

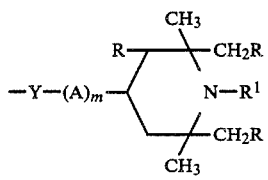

wherein:

R is as defined in Formula II; $R^1$ is as defined in Formula III, Y is —O— or —NR$^{11}$—; A is $C_2$-$C_6$ alkylene;

m is the number 0 or 1;

$R^9$ is the groups $R^8$, $NR^{11}$, $R^{12}$, $OR^{13}$, —NHCH$_2$OR$^{13}$ or —N(CH$_2$OR$^{13}$)$_2$;

$R^{10}$, when n is 1, is the groups $R^8$ or $R^9$;

$R^{10}$, when n is 2, is the group —Y—Q—Y— wherein Q is $C_2$-$C_6$ alkylene optionally interrupted by —N(R$^{1-4}$)—;

$R^{11}$ is $C_1$-$C_{12}$ alkyl, cyclohexyl, benzyl or $C_1$-$C_4$ hydroxyalkyl, or a group of the formula

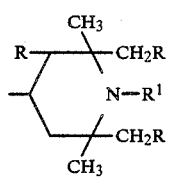

$R^{12}$ is $C_1$-$C_{12}$ alkyl, cyclohexyl, benzyl or $C_1$-$C_4$ hydroxyalkyl;

$R^{13}$ is hydrogen, $C_1$-$C_{12}$ alkyl or phenyl;

$R^{14}$ is hydrogen or the group —CH$_2$OR$^{13}$; or $R^1$ and $R^2$ together are $C_4$-$C_5$ alkylene or oxaalkylene; or $R^1$ and $R^2$ are each a group of the formula 6. Formula VIII

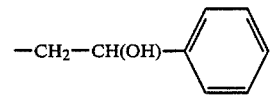

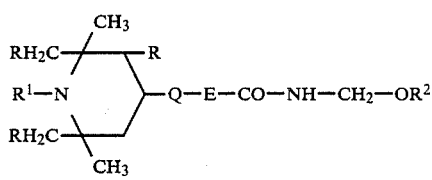

wherein:

n is the number 1 or 2;

R is as defined in Formula II;

$R^{14}$, when n is 1, is $C_4$-$C_{18}$ alkyl, $C_7$-$C_{12}$ aralkyl, the group —CO—R$^{15}$, or $C_1$-$C_4$ alkyl which is substituted by —CN, —COOR$^{16}$, —OH, —OCOR$^{17}$, or —CH$_2$—CH(OH)—⟨phenyl⟩ wherein $R^{15}$ is $C_1$-$C_{12}$ alkyl, $C_2$-$C_4$ alkenyl or phenyl, $R^{16}$ is $C_1$-$C_{18}$ alkyl, $R^{17}$ is $C_1$-$C_{18}$ alkyl, $C_2$-$C_{10}$ alkenyl, cyclohexyl, benzyl or $C_6$-$C_{10}$ aryl; or $R^{14}$, when n is 2, is $C_4$-$C_{12}$ alkylene, 2-butenylene-1,4, xylylene, the group —(CH$_2$)$_2$—OOC—R$^{18}$—COO—(CH$_2$)$_2$ or the group —CH$_2$—OOC—R$^{19}$—COO—CH$_2$— wherein $R^{18}$ is $C_2$-$C_{10}$ alkylene, phenylene or cyclohexylene, and $R^{19}$ is $C_2$-$C_{10}$ alkylene, xylylene or cyclohexylene:

7. Formula IX $$\text{RH}_2\text{C} \underset{\text{RH}_2\text{C}}{\overset{\text{CH}_3}{\diagdown}} \underset{\text{CH}_3}{\overset{R}{\diagup}} \text{N}-R^1 \quad \text{—Q—E—CO—NH—CH}_2\text{—OR}^2 \quad \text{(IX)}$$

wherein:

Q is —N(R$^3$)— or —O—;

E is $C_1$-$C_3$ alkylene, the group —CH$_2$—CH(R$^4$)—O— wherein $R^4$ is hydrogen, methyl or phenyl, the group —(CH$_2$)$_3$—NH— or a single bond;

R is hydrogen or methyl;

$R^1$ is hydrogen, $C_1$-$C_{18}$ alkyl, $C_3$-$C_8$ alkenyl, $C_3$-$C_8$ alkynyl, $C_7$-$C_{12}$ aralkyl, $C_1$-$C_8$ alkanoyl, $C_3$-$C_5$ alkenoyl or glycidyl;

$R^2$ is hydrogen or $C_1$-$C_{18}$ alkyl;

$R^3$ is hydrogen, $C_1$-$C_{18}$ alkyl, $C_5$-$C_7$ cycloalkyl, $C_7$-$C_{12}$ aralkyl, cyanoethyl, $C_6$-$C_{10}$ aryl, the group —$CH_2$—$CH(R^4)$—OH— wherein $R^4$ has the meaning defined above, a group of the formula

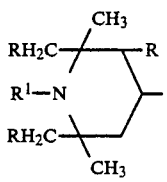

or a group of the formula

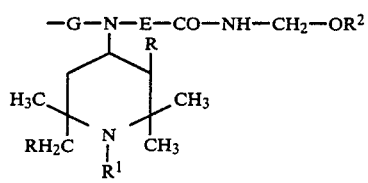

wherein G can be $C_2$-$C_6$ alkylene or $C_6$-$C_{12}$ arylene; or $R^3$ is a group —E—CO—NH—$CH_2$—$OR^2$; and 8. Polymeric compounds of which the recurring structural unit contains a polyalkylpiperidine radical of Formula II, especially polyesters, polyethers, polyamides, polyamines, polyurethanes, polyureas, polyaminotriazines, and copolymers thereof which contain such radicals.

The aforementioned HALS (1–8) are described in detail in U.S. Pat. No. 4,426,472, the disclosure of which is incorporated herein by reference.

It is also possible to use polyalkylpiperidine derivatives of the above Formulas III–VIII which form chemical bonds with the binder of the lacquer. This is the case when the polyalkylpiperidine derivative possesses a reactive group suitable for this purpose, for example a glycidyl group or a methylol group. Examples of such compounds are the polyalkylpiperidine derivatives of Formula IX containing methylol or methylol ether groups.

Polyalkylpiperidine derivatives which are basic compounds can form salts with acids. Examples of suitable acids for such salt formation include but are not limited to inorganic acids or organic carboxylic, sulfonic, phosphonic or phosphinic acids, such as hydrochloric acid, boric acid, phosphoric acid, acetic acid, salicylic acid, toluenesulfonic acid or benzenephosphonic acid.

The polyalkylpiperidine compounds can form complexes with complex-forming metal compounds, for example, with zinc-II-acetate, cobalt-II-acetylacetonate, nickel-II-acetylacetonate, aluminum-II-acetylacetonate, nickel-II-benzoate or aluminum-III-benzoylacetonate.

Preferred HALS to be used with the UVA in the methods of this invention are represented by Formula X:

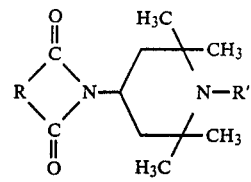

wherein R is a saturated or unsaturated, optionally alkyl- or alkenyl-substituted alkylene or cycloalkylene radical having 2–20 C-atoms and R' is selected from the group consisting of hydrogen;
an alkyl radical having 1–20 C-atoms with methyl being preferred;
an alkenyl radical having 3–5 C-atoms;
an aralkyl radical having 7–12 C-atoms;
—$CH_2$—$CH_2$—CN;
—$CH_2$—$CH_2$—COO—alkyl;
—$CH_2$—$CH(CH_3)$—COO—alkyl;
an acyl radical; and
—($CH_2$—$CH_2O)_n$H, wherein n is 1–10.

In Formula X, R is preferably;

wherein R" is a $C_{12}$-$C_{18}$ alkyl group; a cycloalkylene group; 1,2-cyclohexanediyl or methyl-substituted 1,2-cyclohexanediyl radicals; or a bicyclic divalent aliphatic radical.

The HALS represented by Formula X are described in detail in U.S. Pat. No. 4,356,307, the disclosure of which is incorporated herein by reference.

Among the aforementioned HALS, the following HALS, when used with the UVA in the methods of this invention, are particularly preferred:

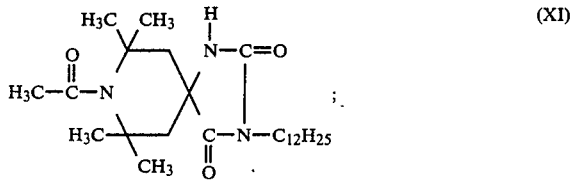

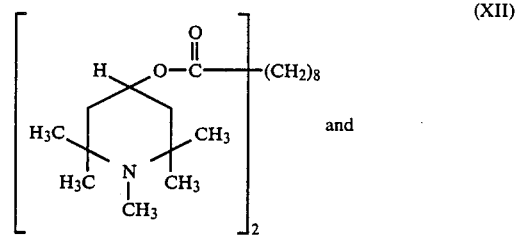

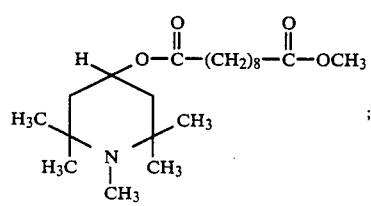

-continued

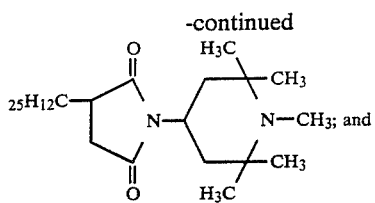
(XIII)

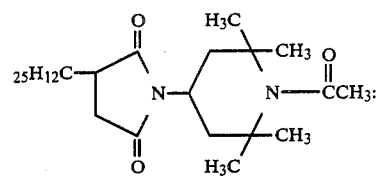
(XIIIA)

Compounds of Formula XI and the mixture in XII are available from Ciba-Geigy as Tinuvin® 440 and Tinuvin® 765, respectively, brand of HALS.

The HALS are generally used in amounts within the range of from about 0.01 to about 5 wt% based as the weight of binder solids.

The UVA utilized in this invention, as a class, are well known in the art. See, for example, U.S. Pat. Nos. 3,118,887 and 3,268,474, the disclosures of which are incorporated herein by reference. What is not known in the art is the surprising and unexpected degree of stabilization achieved with these UVA due to their synergistic combination with the aforementioned HALS.

Preferred UVA are represented by Formula XIV:

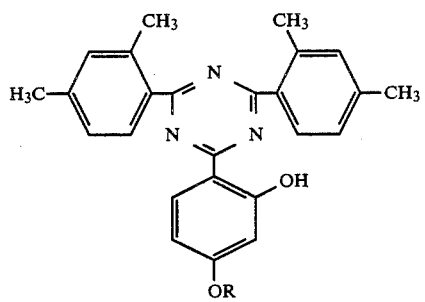
(XIV)

wherein R is hydrogen or alkyl of 1 to 18 carbon atoms with hydrogen or $C_8H_{17}$ being preferred.

The UVA are used in amounts within the range of from about 0.01 to about 5 wt % based on the weight of binder solids.

The synergistic combination of HALS represented by Formula X with UVA represented by Formula XIV are preferred. Combinations wherein R of Formula XIV is hydrogen or $C_8H_{17}$ are more preferred. For example, a preferred synergistic combination is:

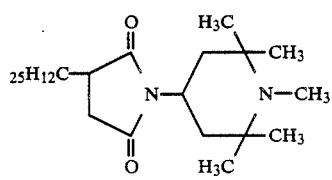
(XIII)

or

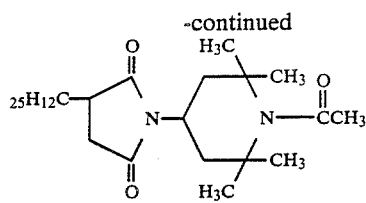
(XIIIA)

with

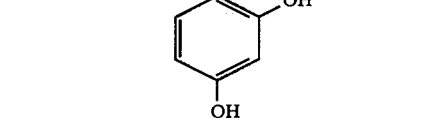
(XIVA)

or

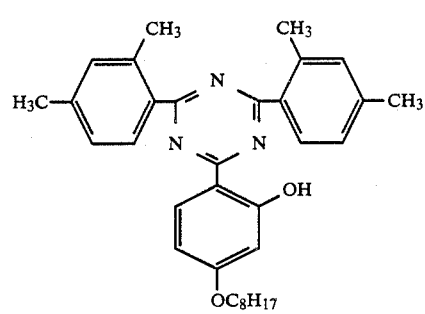
(XIVB)

In addition to the synergistic HALS and UVA combinations, further known stabilizers and co-stabilizers can also be incorporated in the polymers stabilized. These stabilizers can be for example:

1. Antioxidants which are alkylated phenols, alkylated hydroquinones, hydroxylated thiophenyl ethers, alkylidene-bisphenols, benzyl compounds, acylaminophenols, esters of β-(3,5-di-tert-butyl-4-hydroxyphenyl)propionic acid with monohydric or polyhydric alcohols, esters of β-(3,5-di-tert-butyl-4-hydroxy-3-methylphenyl)propionic acid with monohydric or polyhydric alcohols, and amides of B-(3,5-di-tert-butyl-4-hydroxyphenyl)propionic acid;
2. Other ultraviolet light stabilizers;
3. Metal deactivators;
4. Phosphites and phosphonites;
5. Compounds which decompose peroxides;
6. Nucleating agents;
7. Fillers; and
8. Other additives, for example, plasticizers, lubricants, emulsifiers, pigments, fluorescent whitening agents, flame proofing agents, antistatic agents and blowing agents.

The following examples are provided for the purpose of illustration only. The examples should not be construed as limiting the invention in any way as variations of the invention are possible which do not depart from the spirit and scope of the appended claims.

Test Procedure

The effectiveness of the light stabilizer systems of the following examples was determined by measuring the gloss retention (ASTM D523) and yellowness index (ASTM D1925) of a coating after exposure in an accelerated weathering unit such as the QUV (ASTM G53).

Basic Clear Coating Formulations 13.0 parts ACRYLOID ® AT-400 brand of thermosetting acrylic resin (a trademark of Rohm & Haas Co.) (75% solids);

5.25 parts CYMEL ® 303 brand of melamine resin (a trademark of American Cyanamid Co.);

0.15 parts CYCAT ® 4040 brand of toluene sulfonic acid catalyst (a trademark of American Cyanamid Co.) (40% in isopropanol);

3.3 parts Xylene; and 3.3 parts butanol.

In the examples that follow the UVA and HALS utilized are identified as follows:

UVA

1. TINUVIN ® 900 (Ciba-Geigy Corp)

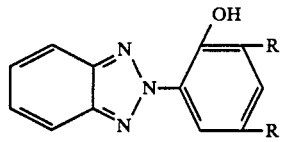

wherein R is

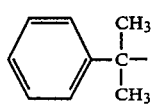

2. SANDUVOR ® 3206 (Sandoz)

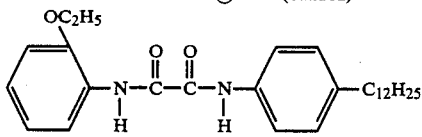

HALS

1. TINUVIN ® 765 (Ciba-Geigy Corp)
a mixture of

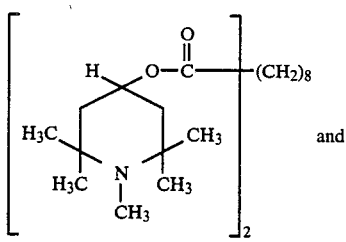

and

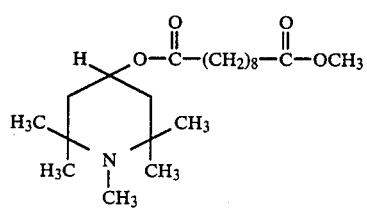

2. TINUVIN ® 440 (Ciba-Geigy Corp)

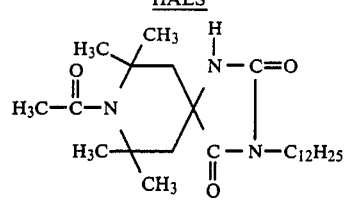

3. SANDUVOR ® 3050

A sterically hindered amine light stabilizer which is a viscous liquid soluble in common coating solvents.

EXAMPLE 1

Light Stabilizing Effectiveness

BONDERITE ® 40 brand of cold rolled steel test panels, coated with a primer surfacer (PPG E5584) and a white base coat based on a thermosetting acrylic resin, were coated with the clear resin formulation described above (containing the stabilizer to be evaluated) and cured for 30 min. at 120° C. Clear coating thickness was about 2 mils. The coated test panels were subjected to weathering in a QUV tester. In this test, the samples were subjected to alternate cycles of UV light at 70° C. for 8 hours and a humid atmosphere with no UV light at 50° C. for 4 hours. Subsequently, the gloss and yellowness index of the surface were measured. The results are reported in Table I.

TABLE I

Synergistic Effect of UVA of this Invention vs. Other Commercial UVA

| Additive* | % Gloss (20°) Retention After 1400 Hrs. | Yellowness Index After 1400 Hrs. |
| --- | --- | --- |
| Formula XIVB (UVA) | 38 | 14 |
| TINUVIN ® 900 (UVA) | 17 | 18 |
| TINUVIN ® 765 (HALS) | 78 | 20 |
| TINUVIN ® 440 (HALS) | 0 | 26 |
| Formula XIVB/TINUVIN ® 765 | 91 | 12 |
| TINUVIN ® 900/TINUVIN ® 765 | 43 | 17 |
| Formula XIVB/TINUVIN ® 440 | 62 | 14 |
| TINUVIN ® 900/TINUVIN ® 440 | 25 | 18 |

*Additive Concentration: 1% alone, 0.5% each in combination based on total resin solids (TRS).

The data reported in Table I demonstrate that the UVA of this invention—e.g., a compound of Formula XIVB—is a more effective synergist, and thus more effective stabilization is provided, than TINUVIN ® 900 brand of UVA.

EXAMPLE 2

Following the procedure of Example 1, a UVA of this invention—i.e., a compound of Formula XIV-B—was compared to TINUVIN ® 900 brand of UVA and SANDUVOR ® 3206 brand of UVA. These UVA were combined with SANDUVOR ® 3050 brand of HALS. The results are reported in Table II.

TABLE II

Synergistic Effect of UVA of this Invention vs. Other Commercial UVA

| Additive* | % Gloss (20°) Retention After 1200 Hrs. | Yellowness Index After 1200 Hrs. |
|---|---|---|
| Formula XIVB (UVA) | 68 | 12 |
| TINUVIN ® 900 (UVA) | 27 | 16 |
| SANDUVOR ® 3206 (UVA) | 30 | 16 |
| SANDUVOR ® 3050 (HALS) | 28 | 20 |
| Formula XIVB/SANDUVOR ® 3050 | 80 | 12 |
| TINUVIN ® 900/SANDUVOR ® 3050 | 53 | 16 |
| SANDOVER ® 3206/SANDUVOR ® 3050 | 41 | 15 |

*Additive Concentration: 1% alone, 0.5% each in combination (based on TRS).

The data in Table II demonstrate that the UVA of this invention—e.g., a compound of Formula XIV-B—results in a much more effective synergistic combination, and thus more effective stabilization is provided than with TINUVIN ® 900 brand of UVA and SANDUVOR ® 3206 brand of UVA.

EXAMPLE 3

Following the procedure of Example 1, a combination of this invention—i.e., the combination of a compound of Formula XIVB (UVA) with a compound of Formula XIII (HALS)—was compared with a combination not of this invention—i.e., the combination of TINUVIN ® 900 brand of UVA and TINUVIN ® 765 brand of HALS. The results are reported in Table III.

TABLE III

UVA/HALS Combinations of this Invention vs. Combinations not of this Invention

| Combination* | % Gloss (20°) Retention In Hrs. | | | | Yellowness Index at 2400 Hrs. |
|---|---|---|---|---|---|
| | 1800 | 2000 | 2200 | 2400 | |
| Formula XIVB/Formula XIII | 96 | 77 | 57 | 36 | 13 |
| TINUVIN ® 900/TINUVIN 765 | 84 | 50 | 35 | 19 | 15 |

*Additive Concentration: 1% each, (based on TRS).

The data reported in Table III demonstrate the superiority of the UVA/HALS combinations of this invention in providing stabilization.

EXAMPLE 4

Following the procedure of Example 1, the combination of the compound of Formula XIVA (UVA) with the compound of Formula XIII (a combination of this invention) was compared with the combination of TINUVIN ® 900 brand of UVA and TINUVIN ® 765 brand of HALS. The results are reported in Table IV.

TABLE IV

UVA/HALS Combinations of this Invention vs. Combinations not of this Invention

| Additive* | % Gloss (20°) Retention After 1800 Hrs. | Yellowness Index After 1800 Hrs. |
|---|---|---|
| Formula XIVA/Formula XIII | 89 | 12 |
| TINUVIN ® 900/TINUVIN ® 765 | 77 | 14 |

*Additive Concentration: 1% each (based on TRS).

The data reported in Table IV demonstrates the superiority of the UVA/HALS combination of this invention in providing stabilization.

What is claimed is:

1. A light stable composition comprising:
   (A) A synthetic polymer useful in coatings and susceptible to degradation by light; and
   (B) An effective amount of a synergistic stabilizer combination comprising:
      (1) a 2,2,6,6-tetraalkylpiperidine compound; and
      (2) a tris-aryl-s-triazine compound represented by the formula:

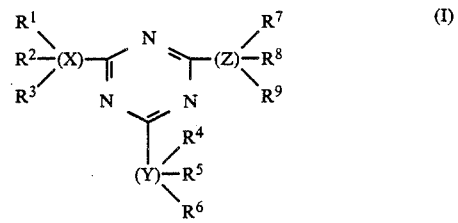

wherein X, Y and Z are each aromatic, carbocyclic radicals of less than three 6-membered rings, and at least one of X, Y and Z is substituted by a hydroxy group ortho to the point of attachment to the triazine ring; and each of $R^1$ through $R^9$ is selected from the group consisting of hydrogen, hydroxy, alkyl, alkoxy, sulfonic, carboxy, halo, haloalkyl and acylamino.

2. The light stable composition of claim 1 wherein said synthetic polymer is an acid catalyzed thermoset acrylic coating or an acid catalyzed thermoset alkyd resin.

3. The light stable composition of claim 1 wherein said piperidine is selected from the group consisting of compounds of the formula:

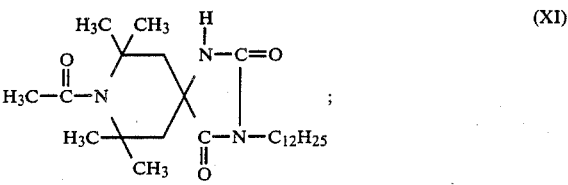

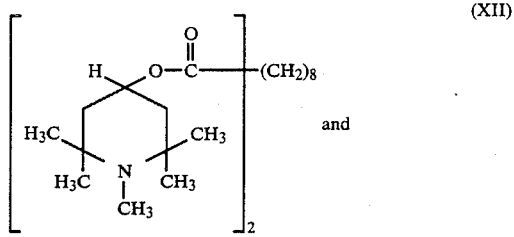

and

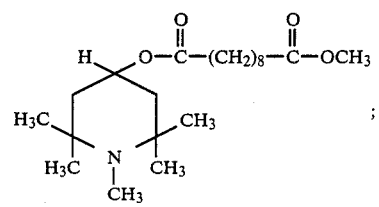

;

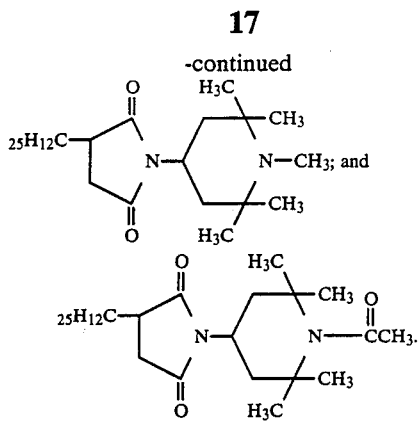

4. The light stable composition of claim 1 wherein said triazine is a compound represented by the formula:

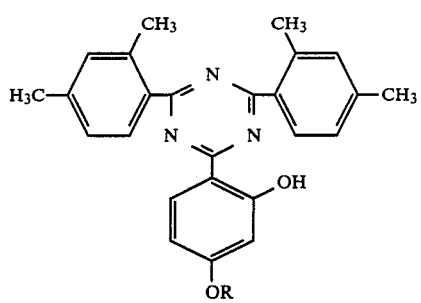

wherein R is hydrogen or alkyl of 1 to 18 carbon atoms.

5. The light stable composition of claim 4 wherein R is hydrogen or $C_8H_{17}$.

6. The light stable composition of claim 1 wherein said piperidine compound is present in an amount of from about 0.01 to about 5 wt. % based on total resin solids and said triazine compound is present in an amount of from about 0.01 to about 5 wt. % based on total resin solids.

7. The light stable composition of claim 1 wherein said piperidine compound and said triazine compound are each added in an amount of about 0.5%, by weight, based on total resin solids.

8. The light stable composition of claim 3 wherein said triazine is a compound of the formula:

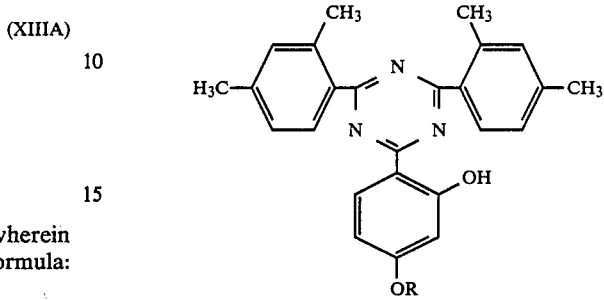

wherein R is hydrogen or alkyl of 1 to 18 carbon atoms.

9. The light stable composition of claim 8 wherein R is hydrogen or $C_8H_{17}$.

10. The light stable composition of claim 8 wherein said piperidine compound is present in an amount of from about 0.01 to about 5 wt. % based on total resin solids and said triazine compound is present in an amount of from about 0.01 to about 5 wt. % based on total resin solids.

11. The light stable composition of claim 8 wherein said piperidine compound and said triazine compound are each added in an amount of about 0.5%, by weight, based on total resin solids.

12. The light stable composition of claim 1 in the form of a film, a coating or a molded article.

13. The light stable composition of claim 2 in the form of a film, a coating or a molded article.

14. The light stable composition of claim 8 in the form of a film, a coating or a molded article.

15. The light stable composition of claim 9 in the form of a film, a coating or a molded article.

* * * * *